United States Patent [19]

Jager et al.

[11] Patent Number: 4,662,054

[45] Date of Patent: May 5, 1987

[54] METHOD OF ASSEMBLING INSULATED RAIL SECTIONS

[75] Inventors: Tilo Jager; Armin Tonsmann, both of Bielefeld; Siegfried Habicht, Leopoldshohe; Eitel Hocker, Bielefeld, all of Fed. Rep. of Germany

[73] Assignee: SCHUCO Heinz Schurmann GmbH & Co., Bielefeld, Fed. Rep. of Germany

[21] Appl. No.: 797,714

[22] Filed: Nov. 13, 1985

Related U.S. Application Data

[63] Continuation of Ser. No. 606,446, May 3, 1984, abandoned.

[30] Foreign Application Priority Data

May 6, 1983 [DE] Fed. Rep. of Germany ....... 3316624

[51] Int. Cl.[4] ............................................. B23P 11/02

[52] U.S. Cl. ....................................... 29/451; 52/731; 49/DIG. 1

[58] Field of Search .................... 29/451, 235; 52/731; 49/DIG. 1

[56] References Cited

U.S. PATENT DOCUMENTS

| | | | |
|---|---|---|---|
| 3,212,179 | 10/1965 | Koblensky | 29/451 |
| 3,411,254 | 11/1968 | Kessler | 49/DIG. 1 X |
| 3,832,818 | 9/1974 | Nahr | 49/DIG. 1 X |
| 3,992,769 | 11/1976 | Jackson | 29/451 X |
| 4,069,631 | 1/1978 | Nahr | 49/DIG. 1 X |
| 4,079,496 | 3/1978 | Schmidt | 49/DIG. 1 X |
| 4,341,007 | 7/1982 | Kruszona | 29/451 |
| 4,423,578 | 1/1984 | Meigs et al. | 49/DIG. 1 X |

*Primary Examiner*—Charlie T. Moon

*Attorney, Agent, or Firm*—Sprung Horn Kramer & Woods

[57] ABSTRACT

An insulating strip for a heat-insulated composite section with two metal rail sections and at least one insulating strip positioned between them and intended for windows, doors, or facades. The insulating strip has a rectangular basic cross-section with anchoring webs along the edge that are accommodated on at least one side in recesses in the metal rail sections. The anchoring webs at at least one end of the insulating strip end at a distance from the face that corresponds to the rectangular basic cross-section.

4 Claims, 6 Drawing Figures

METHOD OF ASSEMBLING INSULATED RAIL SECTIONS

This is a continuation of application Ser. No. 606,446, filed May 3, 1984, now abandoned.

BACKGROUND OF THE INVENTION

The present invention relates to an elastically deformable insulating strip for a heat-insulated composite section with two metal rail sections and at least one insulating strip positioned between them and intended for windows, doors, or facades, wherein the insulating strip has a rectangular basic cross-section with anchoring webs along the edge that are accommodated on at least one side in recesses in the metal rail sections.

The recesses in the metal rail sections that accommodate the longitudinal-edge areas of the insulating strip have undercuts that the anchoring webs on the insulating strip engage behind.

The insulating strips must be inserted into the recesses in the metal rail sections when the composite section is assembled. The metal rail sections that are to be fastened together and the insulating strips are generally six meters long. The rail sections are cut to size without burrs at the end and the initial section of the recess that the insulating strip is threaded into is sharp-edged. Inserting the insulating strip rapidly into the corresponding undercut recess in the rail section requires a lot of skill on the part of the assembling personnel and the time required to insert the strip into the recess accounts for a lot of the assembly time.

SUMMARY OF THE INVENTION

The object of the present invention is to provide an insulating strip of the aforesaid type that can be introduced easily and rapidly into the corresponding undercut recess in the metal rail section.

This object is attained in accordance with the invention in that the anchoring webs at, at least one end of the insulating strip, end at a distance from the face that corresponds to the rectangular basic cross-section.

In one practical embodiment of the invention the front demarcating surface of the anchoring web is a sloping surface, wherein the sloping surface and the face of the insulating strip are about 20 mm apart.

This design allows the insulating strip to be introduced into the recess in the metal rail section at this end from above and to be slid along the recess. This eliminates the problem of threading the strip into the recess from the end.

A preferred embodiment of the invention will now be described with reference to the attached drawings, wherein

DETAILED DESCRIPTION OF THE PREFERRED EMBODIMENTS

Figure 1:
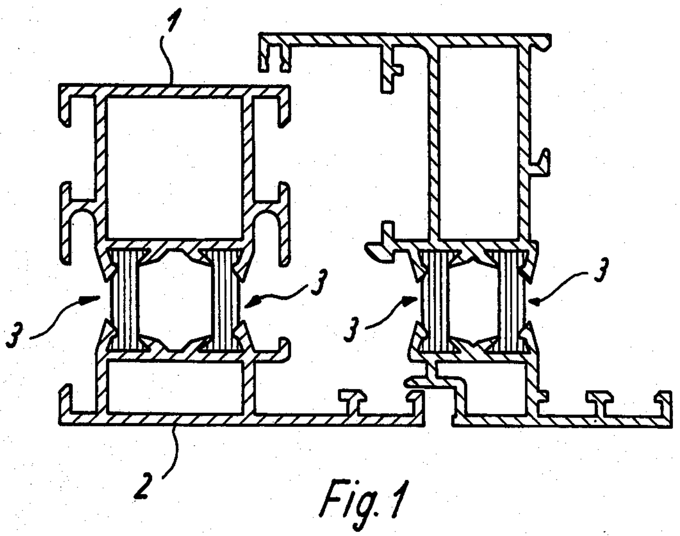
FIG. 1 is a horizontal section through one of the struts in a casement window and through one of the struts in a window frame, with the struts in the form of heat-insulated composite sections in accordance with the invention.
Figure 2:
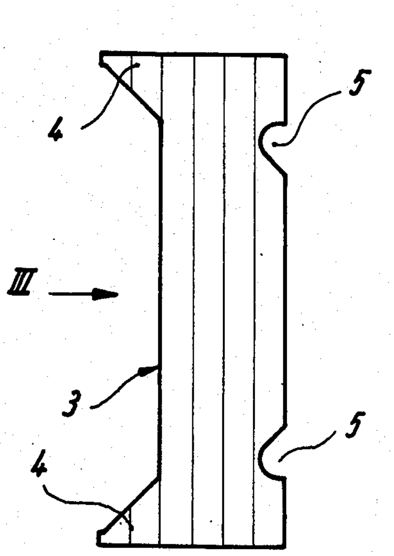
FIG. 2 is a larger-scale front elevation of an insulating strip of the type illustrated in FIG. 1.
Figure 5:
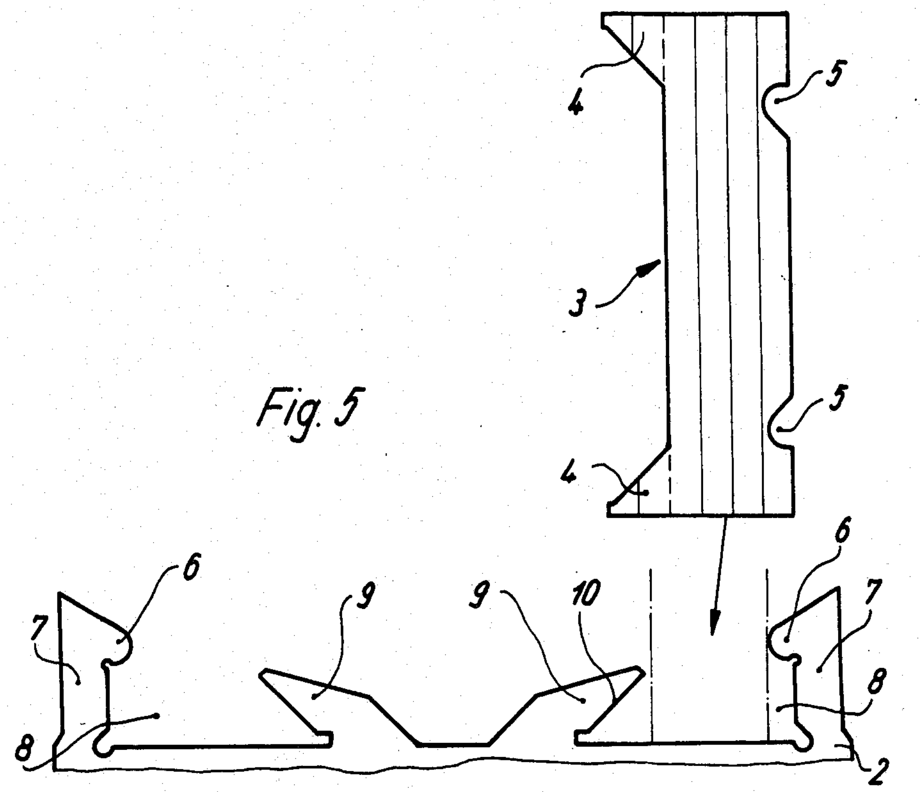
FIG. 5 is a front elevation of an insulating strip and its associated metal rail section in accordance with the invention.
Figure 6:
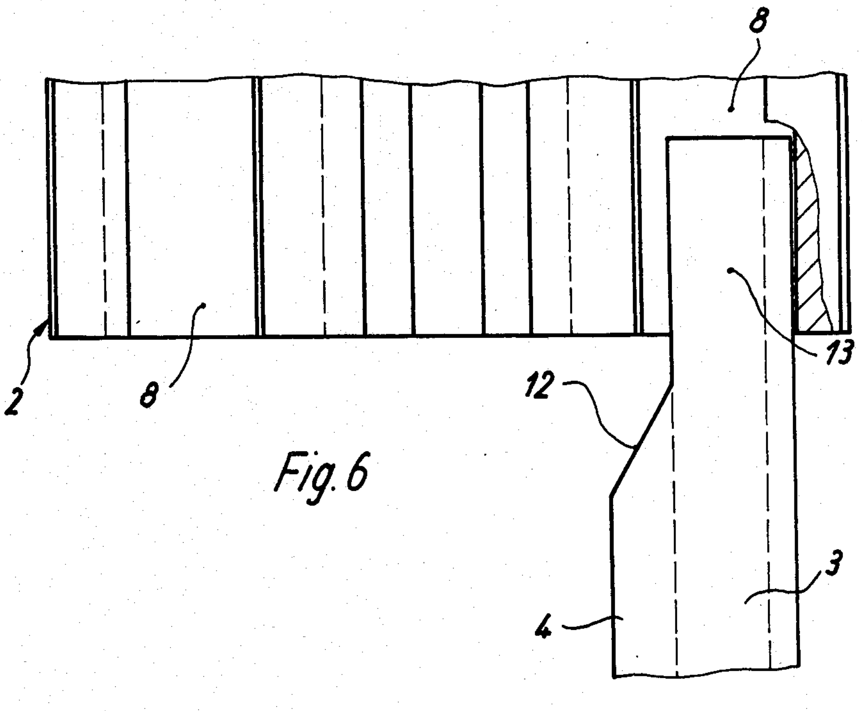
FIG. 6 is a plan corresponding to FIG. 5.

The window struts made out of heat-insulated composite sections illustrated in FIG. 1 consist of two metal rail sections 1 and 2 that are fastened together by two parallel elastically deformable insulating strips 3. As shown in FIG. 2, insulating strips 3 have a rectangular basic cross-section from which triangular anchoring webs 4 extend outward on one side at the longitudinal edges. As is also shown in FIGS. 5–6, insulating strips 3 have grooves 5 on the side opposite anchoring webs 4 for accommodating beads 6 in recesses 8 in metal rail sections 1 and 2. Recesses 8 end on the opposite side in a web 9 with an undercut surface 10, behind which an anchoring web 4 on insulating strip 3 engages.

Figure 3:
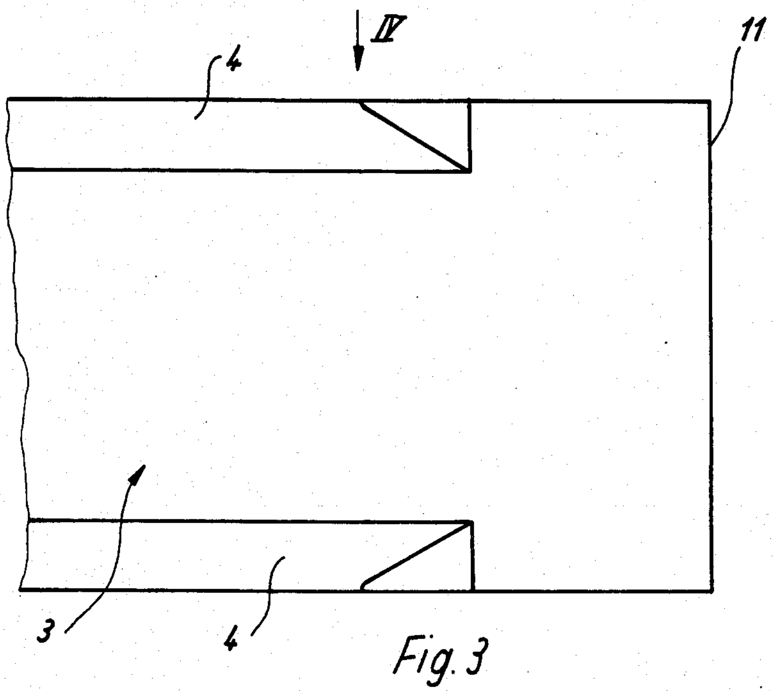
FIG. 3 is a view from the direction indicated by arrow III in FIG. 2.
Figure 4:
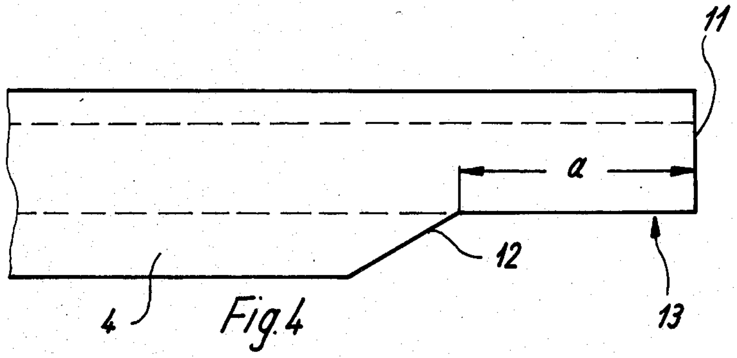
FIG. 4 is a view from the direction indicated by arrow IV in FIG. 3.

At least one end of insulating strip 3 lacks an anchoring web 4. This end is illustrated in FIGS. 3 and 4. The face 11 of insulating strips 3 matches the rectangular basic cross-section of the strip. Anchoring web 4 ends at a distance "a" from face 11. The distance "a" is approximately 20 mm. The face of anchoring web 4 in the embodiment illustrated is a surface 12 that slopes at an angle of 30° from the longitudinal plane of insulating strip 3.

The end 13 that is free of anchoring webs 4 can be inserted into the recess 8 in metal rail section 2 from above as illustrated in FIG. 5. End 13 can then be shifted into the position illustrated in FIG. 6, in which the bead 6 on web 7 engages the accommodation groove 5 in insulating strips 3. This orients end 13 in relation to recess 8 in such a way that insulating strip 3 can easily be longitudinally displaced and inserted into recess 8. Sloping surface 12 also participates to advantage during insertion and facilitates introducing insulating strip 3 into the recess 8 in metal rail section 2.

The parallel insulating strip is similarly introduced into the corresponding recess 8 in metal rail section 1. Once both insulating strips have been mounted, metal rail section 1 is forced up along strips 3 and the two sections 1, 2 fasten together as webs 4 conform to the shape of the insulating strips.

An insulating strip 3 in accordance with the invention reduces the time needed to assemble a composite section by about half.

It will be appreciated that the instant specification and claims are set forth by way of illustration and not limitation, and that various modifications and changes may be made without departing from the spirit and scope of the present invention.

What is claimed is:

1. A process for assembling a heat-insulated composite section with two metal rail sections and at least two elastically deformable insulating strips positioned between them, wherein each insulating strip has a rectangular basic cross-section having two end faces and two main surfaces with anchoring webs along edges and extending upwardly from the main surface and wherein each metal rail has a pair of longitudinal undercut recesses in at least one side, comprising the steps of:

a. removing the anchoring webs from one end of each insulating strip up through a distance from the one end face;

b. introducing the one end of one insulating strip at one web from above into one recess of one metal rail section until it rests at the bottom of the recess;
c. introducing the one end of the other insulating strip at one web from above into the other recess of the one metal rail section until it rests at the bottom of the recess;
d. introducing the one end of the two insulating strips at the other webs from below into the recesses of the other metal rail section until they rest at the bottom of the recesses; and
e. sliding said two insulating strip into and along said undercut recesses by elastically deforming said anchoring webs until said anchoring webs are fully seated in said undercut recesses in said rails.

2. The process as in claim 1, wherein the web is removed and the surface demarcating the one main surface and the anchoring web is formed as a sloping surface.

3. The process as in claim 2, wherein the sloping surface slopes at an angle of 30° from the plane of the one main surface of the insulating strip.

4. The process as in claim 2, wherein the distance between the sloping surface and the one end face of each insulating strip is about 20 mm.

* * * * *